June 30, 1964 R. O. GRAY ETAL 3,139,485
TELEVISION RECEIVER CHASSIS
Original Filed Sept. 10, 1954 3 Sheets-Sheet 1

RICHARD O. GRAY
NICHOLAS KAFKA
*INVENTORS.*

BY Francis W. Crotty
THEIR ATTORNEY.

TELEVISION RECEIVER CHASSIS

Original Filed Sept. 10, 1954 3 Sheets-Sheet 2

RICHARD O. GRAY
NICHOLAS KAFKA
*INVENTORS.*

BY Francis W. Crotty
THEIR ATTORNEY

June 30, 1964 R. O. GRAY ETAL 3,139,485

TELEVISION RECEIVER CHASSIS

Original Filed Sept. 10, 1954 3 Sheets-Sheet 3

RICHARD O. GRAY
NICHOLAS KAFKA
*INVENTORS.*

BY Francis W. Crotty
THEIR ATTORNEY.

United States Patent Office 3,139,485
Patented June 30, 1964

3,139,485
TELEVISION RECEIVER CHASSIS

Richard O. Gray, Broadview, and Nicholas Kafka, Lombard, Ill., assignors to Zenith Radio Corporation, a corporation of Delaware Original application Sept. 10, 1954, Ser. No. 455,128. Divided and this application Feb. 23, 1960, Ser. No. 10,346
4 Claims. (Cl. 178—7.8)

This invention is directed to a new and improved chassis construction for a television receiver of the direct-view type; more particularly, the invention pertains to a new and improved means for supporting circuit components and a cathode-ray picture tube in operative relationship to each other and for enclosing the combined chassis and picture tube structure within a suitable cabinet. This application is a division of copending application Serial No. 455,128, filed September 10, 1954, and issued January 28, 1964 as Patent 3,119,900.

Conventionally, the chassis of a television receiver comprises a sheet metal structure, several inches high, extending across virtually the entire area of one wall of the receiver cabinet. In most receivers, the chassis is mounted on the bottom wall of the cabinet, although it is quite common to affix it to one of the sides. In most instances, the picture tube of the receiver is mounted on the chassis and the entire chassis-tube assembly is subsequently positioned within the cabinet. Generally, speaking, major components such as electron-discharge devices, transformers, rectifiers and the like are mounted on one side of the chassis and relatively small circuit components such as resistors, capacitors and inductors and most of the wiring of the receiver are located on the opposite side of the chassis. Because tube failures present the most frequent cause of receiver trouble, the tubes are usually mounted on the side of the chassis most readily accessible from the back of the receiver cabinet. Many of these components are positioned beneath the picture tube or in other difficult-to-reach locations in order to avoid an oversize chassis and cabinet; even so, the cabinet must be made substantially greater in height than the picture tube in order to accommodate the entire receiver. Moreover, many times the receiver may fail in operation due to a breakdown in some component such as a resistor, capacitor, etc. When this occurs, it is necessary to pull the entire chassis and picture tube from the cabinet in order to gain access to the wiring and minor components of the receiver. In a receiver of conventional construction this procedure is difficult and time consuming and often requires that the receiver be taken to a service shop, since it may not be conveniently performed in the field.

It is a primary object of the invention, therefore, to provide a new and improved television receiver chassis which permits ready and convenient access to all of the operating components of the receiver.

It is a further object of the invention to provide a new and improved television receiver chassis which substantially reduces servicing problems and at the same time provides for a substantial reduction in manufacturing costs.

It is a corollary object of the invention to provide a combination chassis-cabinet construction for a television receiver which is economical to manufacture and which provides for rapid and efficient assembly and/or disassembly of the receiver.

The invention, in accordance with one of its aspects, is directed to a television receiving set comprising a direct-view type of cathode-ray picture tube having an enlarged substantially conical section terminating in a rectangular display screen and further having an elongated reduced diameter neck section. There is a chassis assembly including an open framework of at least two horizontally disposed support members and at least two vertically disposed support members. A plurality of electrical circuit components are mounted on the horizontally disposed support members. The picture tube and chassis assembly are so arranged that at least a portion of the picture tube is disposed within the framework.

The features of the invention which are believed to be new are set forth with particularity in the appended claims. The invention itself, together with further objects and advantages thereof, may best be understood, however, by reference to the following description when taken in conjunction with the accompanying drawings, in the several figures of which like reference numerals indicate like elements and in which:

Figure 1:
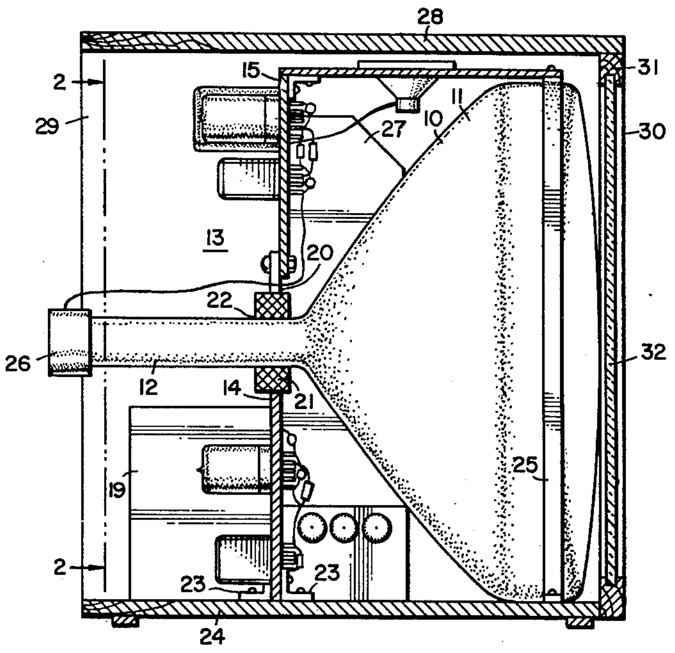
FIGURE 1 is a cross-sectional view, partly schematic, of a television receiver comprising a chassis and cabinet.

The television receiver shown in FIGURE 1 is of the direct-view type and includes the usual cathode-ray picture tube 10 having an enlarged substantially conical viewing screen section 11 and an elongated reduced-diameter neck section 12. Picture tube 10 may be of the type having a circular viewing screen or may more conventionally have a rectangular screen, in which case the conical section 11 is in the form of a truncated pyramid.

The receiver of FIGURE 1 further includes an electrically conductive base structure 13 comprising a first vertically disposed conductive member 14 and a second conductive member 15 affixed to member 14 in any suitable manner. The relative positions of members 14 and 15 and their respective configurations are more readily apparent in the view of FIGURE 2; as shown therein, conductive member 14 includes a plurality of sockets or similar provisions 16 for mounting a plurality of electron-discharge devices (not shown in FIGURE 2). Similarly, a number of tube sockets 17 are mounted on conductive member 15, which may be bolted to member 14 to form a unitary conductive base structure. A number of other electrical components such as a transformer 18 and a tuner 19 may be mounted on the same side of conductive member 14 as the electron-discharge device. Conductive member 14 also includes an opening 20 which is substantially larger in diameter than neck section 12 of picture tube 10, as indicated in FIGURE 1.

As further shown in FIGURE 1, an electromagnetic deflection yoke 21 is mounted on base structure 13 with the central opening 22 of the deflection yoke aligned with opening 20 of the base structure. Preferably, deflection yoke 21 is directly mounted in nested concentric relation within the opening of base structure 13 as shown, although this is not necessary and the deflection yoke may be supported by an adjustable bracket to permit horizontal displacement along the neck of picture tube 10. The entire chassis assembly comprising conductive members 14 and 15 and deflection yoke 21 is maintained in a vertical position by means of suitable clamps 23 affixed to conductive member 14 and to a support member 24; in this particular embodiment the support member comprises the bottom wall of a television receiver cabinet. In addition, tube 10 is maintained in a predetermined position on support member 24 by means of a strap 25 preferably bolted to the support member and encompassing viewing screen section 11 of the picture tube. The picture tube is thus mounted with its viewing screen section 11 disposed in fixed spatial relationship with respect to conductive base structure 13 and with neck section 12 extending through deflection yoke opening 22 and through base structure opening 20.

Base structure 13 further includes means for mounting a plurality of electrical circuit devices other than vacuum tubes; preferably, these additional devices such as resistors, capacitors, etc., are located on the opposite side of base structure 13 from the tubes. Suitable provisions are made for connecting various circuit elements to the usual socket 26 on picture tube 10 and the resistors and capacitors are, of course, connected as desired to the various electron-discharge tubes. Base structure 13 may also include an additional vertical conductive member 27 affixed to members 14 and 15 to provide mounting space for additional circuit components and to strengthen the arrangement mechanically.

Figure 2:
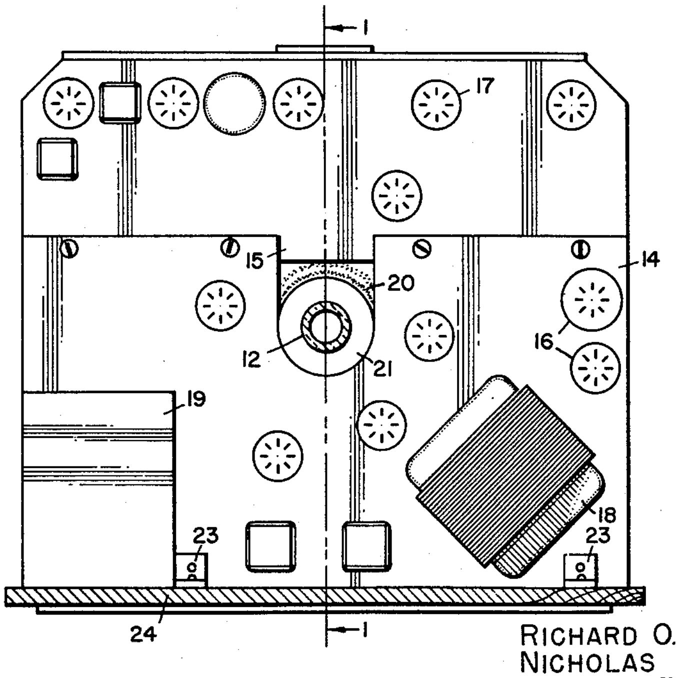
FIGURE 2 illustrates the base structure of the television receiver of FIGURE 1 and is a cross-sectional view taken along line 22 therein.

The cabinet for the receiver of FIGURES 1 and 2 is formed in part by support member 24; the remainder of the cabinet is preferably constructed as a unitary hood or cowl which fits down over the operating components of the receiver and is fastened to support member 24. Thus, the cabinet may include a top wall 28, a pair of side walls 29 (only one is shown), and a front or viewing screen wall 30. Viewing screen wall 30 may comprise an escutcheon or rim member 31 and the usual transparent safety glass 32 mounted in the escutcheon.

In comparison with conventional construction, the chassis and cabinet structures incorporated in the receiver of FIGURES 1 and 2 possess several advantages. All of the electron-discharge devices of the receiver are readily accessible from the rear of the cabinet, thus facilitating replacement in the event of failure; it is not necessary to reach around the transformer, tuner, picture tube, or any other major component of the receiver in order to reach any of the tubes. On the other hand, replacement of the other electrical devices of the receiver, the resistors, capacitors, etc., mounted on the opposite side of base structure 13, is at least as convenient as in conventional receivers. To replace these components, it is only necessary to detach the cowl comprising walls 28–30 from support member 24 and remove the top part of the cabinet; all of the components are then exposed. Furthermore, a simple flat plate may be employed in the chassis to replace the more complex box-like conventional structures, which results in a substantial saving in manufacturing costs. Assembling operations are simplified to the same extent as servicing of the receiver.

Figure 3:
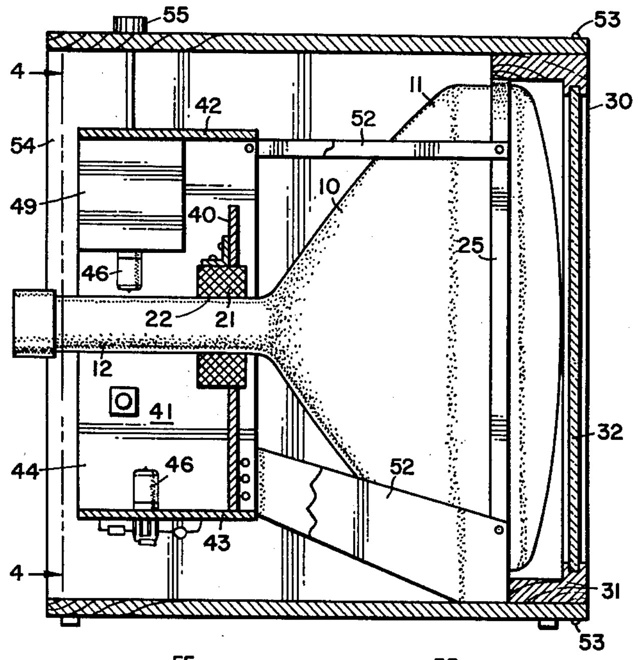
FIGURE 3 is a cross-sectional view, partly schematic, of a television receiver incorporating an embodiment of the chassis and cabinet construction of the invention.

FIGURE 3 is a cross-sectional view of a television receiver incorporating an embodiment of the invention which provides somewhat greater wiring space and somewhat improved service accessibility as compared with the receiver of FIGURES 1 and 2. The receiver of FIGURE 3 includes a cathode-ray picture tube 10 having an enlarged viewing-screen section 11 and a relatively small-diameter neck section 12; as before, the picture tube may be of entirely conventional construction. Neck section 12 extends through the central opening 22 of an electromagnetic deflection yoke 21 supported on a brace 40 which is preferably formed of sheet metal.

Figure 4:
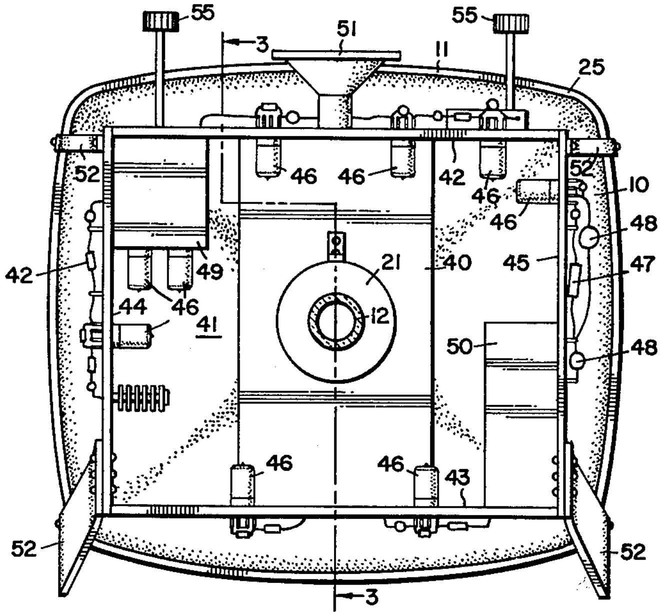
FIGURE 4 is a rear view of the apparatus of FIGURE 3 exclusive of the cabinet portions thereof.

As best shown in FIGURE 4, brace 40 is a part of an electrically conductive base structure 41 which is rectangular in form and includes a pair of horizontally disposed members 42 and 43 and a pair of vertically disposed members 44 and 45; members 42–45 may be conveniently formed by bending a single sheet of metal into the desired rectangular shape. The conductive members of base structure 41 include provisions for mounting a plurality of electron-discharge devices 46 within the rectangular structure; in addition, the base structure members include provisions for mounting additional electrical circuit devices such as resistors 47 and capacitors 48 around the outside of the structure. A conventional tuner 49 may be mounted within the base structure and the usual sweep transformer 50 may also be disposed therein. In addition, a loudspeaker 51 may be mounted on any of the individual sides of base structure 41; in the illustrated apparatus, the loudspeaker is affixed to the top member 42 of structure 41. Other receiver components may be accommodated in like manner.

As shown in FIGURE 3, the picture tube 10 is secured to an escutcheon plate 31 by means of a strap 25 which encircles the enlarged cone section 11 of the picture tube and is bolted or otherwise fastened to escutcheon 31. The picture tube is also maintained in a fixed spatial relationship with respect to chassis structure 41 by means of a plurality of braces 52 which interconnect strap 25 and the base structure. A conventional transparent viewing plate 32 is mounted on escutcheon 31 to form the front wall 30 of the receiver cabinet. The remainder of the cabinet comprises a cylindrical hood or cowl 54 which encompasses conductive base structure 41 and picture tube 10 and is secured to escutcheon plate 31 by means of a series of bolts 53. It should be noted that cowl 54 may be of any desired cross-sectional configuration, depending only upon the desired external appearance of the receiver. The tuning knobs 55 of the receiver may be positioned at the top of the receiver, as shown, or may be mounted on the sides of the cabinet.

The embodiment of FIGURES 3 and 4 retains the general advantages of the receiver of FIGURES 1 and 2 and, in addition, provides considerable increased wiring space for mounting the individual operating components of the receiver. As in the receiver of FIGURES 1 and 2, all of the vacuum tubes of the receiver are readily accessible from the rear of the cabinet so that they may be replaced without requiring removal of any of the other cabinet walls and without any necessity for removing the picture tube or chassis from the cabinet. Servicing of the other electrical components of the receiver is also exceedingly simple; in order to obtain access to those components, it is only necessary to remove knobs 55 and to release the bolts securing cowl 54 to the support member comprising escutcheon 31 and face plate 32; the receiver is then turned so that it rests upon support 30 and the entire cowl is lifted from the receiver to expose all of the wiring. The receiver is extremely compact, and the relatively simple construction of both its base structure 41 and the cabinet comprising support member 30 and cowl 54 leads to considerable manufacturing economies.

To summarize the invention as embodied in FIGURES 3 and 4, picture tube 10 may be characterized as a direct-view type of cathode-ray picture tube having an enlarged substantially conical section terminating in a rectangular display screen and further having an elongated reduced diameter neck section. A chassis assembly is illustrated in FIGURES 3 and 4 and includes an open framework of at least two horizontally disposed support members 42, 43 and at least two vertically disposed support members 44, 45. The chassis assembly also includes a plurality of electrical circuit components, such as vacuum tubes, condensers, resistors, etc., mounted on the horizontally disposed support members 42, 43. The picture tube and chassis assembly are mounted within the television receiving set in such a way that at least a portion of the cathode-ray tube is disposed within the framework composed of support members 42–45; specifically, in the embodiment shown the neck section of the picture tube is disposed within the framework.

Figure 5:
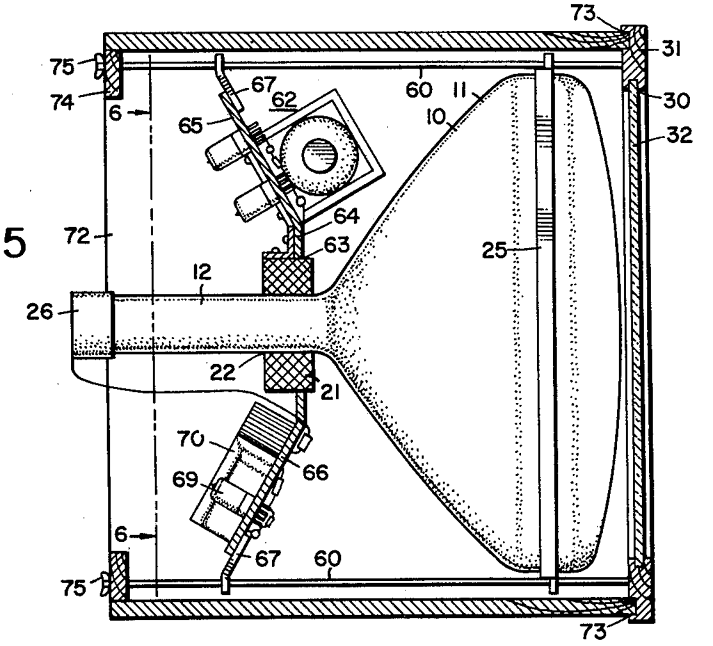
FIGURE 5 is a cross-sectional view of another television receiver.

The receiver of FIGURE 5 includes, as before, a picture tube 10 having an enlarged conical viewing-screen section 11 and a small diameter neck section 12. The picture tube is mounted on a support member comprising an escutcheon plate 31 by means of a plurality of support rods 60 which may be threaded into escutcheon 31 and a strap 25 which encompasses the cone section of the tube and is secured to the support rods. As before, a transparent viewing-screen plate 32 is suitably mounted in escutcheon 31 to form the front wall 30 of the receiver. An electromagnetic deflection yoke 21 encompasses neck section 12 of the picture tube; the neck section extends through the central opening 22 of the deflection yoke. Deflection yoke 21 is mounted on a conductive base structure 62 and is aligned with an opening 63 in the base structure; preferably, the deflection yoke is located directly within aperture 63 and is affixed to base 62 by suitable brackets. Base structure 62 includes a vertically disposed central portion 64 and a pair of edge portions 65 and 66 which extend from central portion 64 at acute angles with respect to the plane of the central portion. The base structure is affixed to support rods 60 by means of a plurality of brackets 67; thus, brackets 67 and rods 60 provide means for mounting the base structure on support member 30, the front wall of the receiver cabinet.

Figure 6:
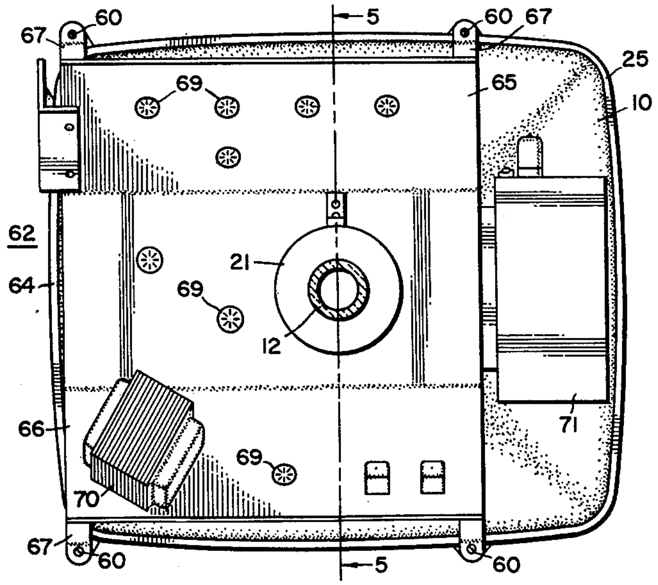
FIGURE 6 is a cross-sectional view taken along line 6—6 of FIGURE 5 showing the base structure thereof.

As shown in FIGURE 6, each of the three portions 64, 65 and 66 of base member 62 is provided with a plurality of sockets 69 or similar provisions for mounting of the electron-discharge devices of the receiver. Additional major components such as a transformer 70 and a tuner 71 may be affixed to the same side of the base structure. Of course, base 62 includes the usual provisions for mounting capacitors, resistors and other small circuit components on the opposite side of the base from the vacuum tubes.

The cabinet for the receiver of FIGURE 5 comprises the support member 30, including escutcheon 31 and transparent viewing plate 32, and a cylindrical cowl 72 which fits into a recess 73 in the escutcheon. The end of cowl 72 farthest from the escutcheon is provided with a plurality of tabs or extensions 74 through which support rods 60 extend so that the cowl may be secured to member 30 by means of wing nuts or similar fastening devices 75. A conventional socket 26 may be employed to connect the operating elements of picture tube 10 to the circuit components mounted on base structure 62.

The receiver illustrated in FIGURES 5 and 6 provides ready access to all of the tubes of the receiver from the rear of the cabinet. Moreover, as in the previously described structures, access to the other operating components may be achieved simply by removing cowl 72 to expose the wiring and electrical components on the front side of base structure 62. This particular construction is preferred because it provides substantially greater clearance between the conductive base structure and the picture tube without requiring the somewhat more elaborate rectangular construction of FIGURES 3 and 4. Thus, the rather narrow spacing between the picture tube and the chassis in the receiver of FIGURE 1 is avoided, which results in an even greater improvement in accessibility for assembling and servicing the receiver. At the same time, although the overall height of structure 62 is still approximately equal to the height of the picture tube, as in each of the previously-described receivers, the base structure shown in FIGURE 5 provides a somewhat greater area for the mounting of the minor circuit components than is available in the embodiment of FIGURE 1.

While particular embodiments of the invention have been shown and described, modifications may be made, and it is intended in the appended claims to cover all such modifications as may fall within the true spirit and scope of the invention.

We claim:

1. A television receiving set comprising:

a direct-view type of cathode-ray picture tube having an enlarged substantially conical section terminating in a rectangular display screen of a predetermined height and width and further having an elongated reduced diameter neck section;

a chassis assembly including a four-sided, four-cornered, box-like open framework of two horizontally disposed elongated support members of substantially equal length and lying one above the other in two different horizontal planes spaced apart a distance less than the height dimension of said picture tube, two vertically disposed elongated support members lying in two different vertical planes normal to the horizontal planes and spaced apart a distance substantially equal to the length of said horizontally disposed members and rigidly connected to said two horizontally disposed members at the extremities thereof, and a plurality of electrical circuit components mounted on a plurality of said support members;

and means for rigidly mounting said chassis assembly and picture tube with at least the neck section of the picture tube encompassed by a projection of said framework.

2. A television receiving set comprising:

a direct-view type of cathode-ray picture tube having an enlarged substantially conical section terminating in a rectangular display screen of a predetermined height and width and further having an elongated reduced diameter neck section;

a chassis assembly including a four-sided, four-cornered, box-like open framework of two horizontally disposed elongated support members of substantially equal length and lying one above the other in two different horizontal planes spaced apart a distance less than the height dimension of said picture tube, two vertically disposed elongated support members lying in two different vertical planes normal to the horizontal planes and spaced apart a distance substantially equal to the length of said horizontally disposed members and rigidly connected to said two horizontally disposed members at the extremities thereof, and a plurality of electrical circuit components mounted on horizontally disposed support members;

and means for rigidly mounting said chassis assembly and picture tube with the neck section of the picture tube disposed in substantially the center of a projection of said framework.

3. A television receiving set comprising:

a direct-view type of cathode-ray picture tube having an enlarged substantially conical section terminating in a rectangular display screen of a predetermined height and width and further having an elongated reduced diameter neck section;

a chassis assembly substantially confined within a rearward projection of said screen and including a four-sided, four-cornered, box-like open framework of two horizontally disposed elongated support members of substantially equal length and lying one above the other in two different horizontal planes spaced apart a distance less than the height dimension of said picture tube, two vertically disposed elongated support members lying in two different vertical planes normal to the horizontal planes and spaced apart a distance substantially equal to the length of said horizontally disposed members and rigidly connected to said two horizontally disposed members at the extremities thereof, and a plurality of electrical circuit components mounted on a plurality of said support members;

and means for rigidly mounting said chassis assembly and picture tube with at least the neck section of the picture tube encompassed by a projection of said framework.

4. A television receiving set comprising:

a direct-view type of cathode-ray picture tube having an enlarged substantially conical section terminating in a rectangular display screen of a predetermined height and width and further having an elongated reduced diameter neck section;

a chassis assembly substantially confined within a rearward projection of said screen and including a four-sided, four-cornered, box-like open framework of two horizontally disposed elongated support members of substantially equal length and lying one above the other in two different horizontal planes spaced apart a distance less than the height dimension of said picture tube, two vertically disposed elongated support members lying in two different vertical planes normal to the horizontal planes and spaced apart a distance substantially equal to the length of said horizontally disposed members and rigidly connected to said two horizontally disposed members at the extremities thereof, and a plurality of electrical circuit components mounted on a plurality of said support members;

means for rigidly mounting said chassis assembly and picture tube with at least the neck section of the picture tube encompassed by a projection of said framework;

and a cabinet structure having a height and width approximately equal to the height and width, respectively, of said screen and substantially surrounding said picture tube and said chassis assembly, said cabinet structure having a front opening substantially fully occupied by said screen.

References Cited in the file of this patent

UNITED STATES PATENTS 2,896,201 Ackerman ............... July 21, 1959

OTHER REFERENCES

Lorenz: Berichte No. 3, September 1937; page 116.

Television Engineering, by Fink, McGraw-Hill Book Company, Inc., New York, copyrighted 1952 (page 574 cited).

The Murphy V200, by P. C. Kidd; Journal of the Television Society; vol. 6, No. 10; April-June 1952; pages 385–389.